Dec. 20, 1955    A. D. MACK    2,727,632
SINTERED POROUS VITREOUS DISC WITH HEATER
Filed April 8, 1952
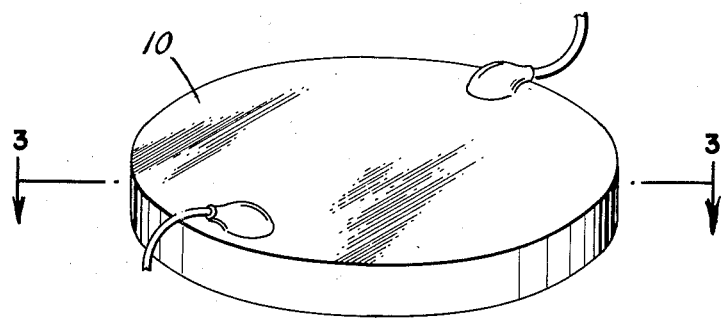
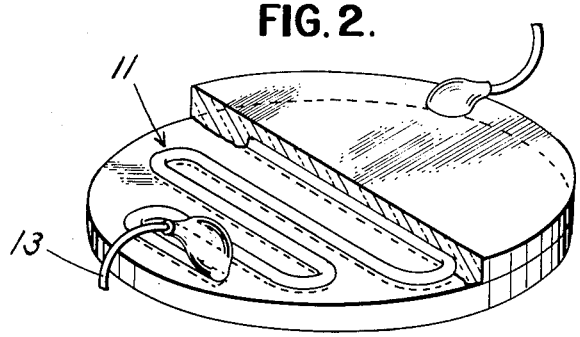
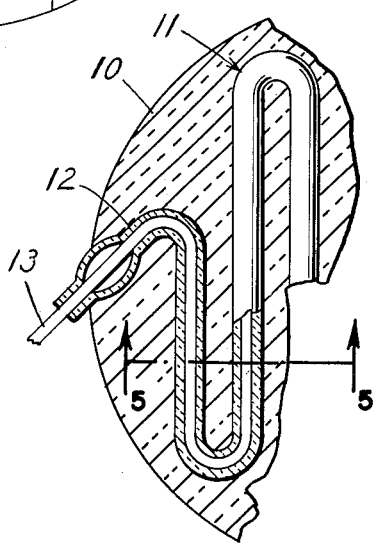
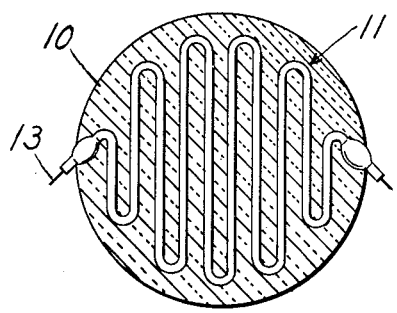
INVENTOR
ARTHUR D. MACK
BY
ATTORNEY

United States Patent Office 2,727,632
Patented Dec. 20, 1955

2,727,632

SINTERED POROUS VITREOUS DISC WITH HEATER

Arthur David Mack, Chevy Chase, Md.

Application April 8, 1952, Serial No. 281,254

4 Claims. (Cl. 210—113.5)

(Granted under Title 35, U. S. Code (1952), sec. 266)

The invention described herein may be manufactured and used by or for the Government of the United States of America for governmental purposes without the payment of any royalties thereon or therefor.

This invention relates to a method and apparatus for carrying out the filtration of materials which must be kept at controlled elevated temperatures for such purposes.

Heretofore, the methods used included the use of external heaters such as steam, hot water or electrical heaters. These interfered with direct visual observation of the materials being filtered, provided an inefficient heating of the filtering medium itself, provided an inconvenient method involving bulky external heaters, were difficult to use for small volumes to be filtered and, where suction was applied to facilitate filtration, difficulties resulted from precipitation caused by cooling.

The invention involves a filter body of sintered glass or a like inert vitreous material having embedded therein a heating unit for controlled electrical heating during filtration comprising a glass tube having a resistance wire threaded therethrough and insulated by the glass tube from contact with the material being filtered through the filter body.

One object of my invention is to provide a means for filtration whereby unobstructed observation of the material during filtration is obtained.

Another object is to provide an efficient, convenient and less bulky arrangement for heating and controlling the temperature of the filtering medium.

Another object is to provide relative ease in filtering large or small volumes.

Another object is to provide a filter means which can be used in any type of apparatus or in any arrangement.

Another object is to provide complete portability of the apparatus.

Another object is to eliminate the difficulties, so often caused by precipitation resulting from cooling, where suction is applied to facilitate filtration.

With the above and other objects in view the invention has particular relation to certain novel features of construction, arrangement of parts and use, examples of which are illustrated in the accompanying drawings wherein:

Fig. 1 is an elevational view of the assembled filtering disc;

Fig. 2 is a view similar to Fig. 1 but with a part broken away to show the heating unit;

Fig. 3 is a sectional view taken along line 3—3 of Fig. 1;

Fig. 4 is a sectional view of the heating unit showing the heating wire encased in the glass tube; and Fig. 5 is a view taken along line 5—5 of Fig. 4.

Referring more particularly to the drawings wherein like numerals of reference designate the same parts in each of the figures, the numeral 10 indicates the filter bed which is made of sintered glass or other material inert to the medium to be filtered and is in the form of a disc. The disc 10 may be of any selected shape but is here illustrated as being circular in form. Embedded in the disc 10 is a heating unit 11 comprising a sinuous thin-walled glass tube 12 and a resistance wire 13 which is threaded through the tube.

In constructing the filter unit, the resistance wire 13 is first threaded into the glass tube and, bent as shown in Fig. 3, to form the heating unit 11. This heating unit 11 is then embedded in the glass granules and sintered in an annealing oven at a temperature and for a time approaching but not reaching the liquidus temperature of the granules. Examples of inert materials and their sintering temperatures and times required are given for instance in: Threadwell-Hall, vol. II, Ninth English Edition Analytical Chemistry, Quantitative, page 31. See also: Science No. 2662, 103, 21, 1946, article on sintered glass discs by Arthur D. Mack. The resulting filter unit is thereby provided with a heating wire which is insulated by the glass tube 12 from contact with the material to be filtered. The ends of the resistance wire extend beyond the ends of the glass tube 12 for connection in an electric circuit.

These filtration units or discs may be constructed in any size or shape, either as independent units, or for incorporation into transparent funnels, tubes or crucibles. When the disc is to be incorporated into a funnel, crucible or tube, it is first prepared and sintered in a carbon mold, which is subsequently removed when the sintering is completed. The filter unit or disc with its contained heating element is then sealed into the body of an appropriate transparent crucible, tube or funnel. The disc may be constructed of soft glass, Pyrex, quartz, Vycor, or other vitreous heat resistant material chemically inert to the medium to be filtered, to suit the particular needs of the materials involved. The chemical composition of Pyrex glass is:

|  | Percent |
|---|---|
| $SiO_2$ | 80.5 |
| $CaO$ | .3 |
| $Na_2O$ | 4.4 |
| $As_2O_5$ | .7 |
| $MgO$ | .1 |
| $K_2O$ | .2 |
| $Fe_2O_2$ | .3 |
| $Al_2O_3$ | 2.0 |
| $B_2O_3$ | 11.8 |

The Vycor brand glasses contain a high percentage of silica. Vycor glass No. 790 for instance comprises 96 percent silica. If it is desirable to heat the material to be filtered to a higher temperature, a filter disc made of a material of a corresponding higher liquidus temperature will have to be selected.

With rheostatic control of the heating wire and adequate stirring of the material to be filtered, proper control of the filtering process can be accomplished. The quantity of material that can be filtered will depend entirely on the area of the filtering disc and the type of container in which the disc is mounted.

Obviously many modifications and variations of the present invention are possible in the light of the above teachings. It is, therefore, to be understood that within the scope of the appended claims the invention may be practiced otherwise than as specifically described.

What is claimed is:

1. A filtration device comprising a porous body of sintered inert vitreous material in which is embedded an electric resistance heating wire insulated with glass.

2. A filtration device comprising a porous body of sintered vitreous material having a sinuous glass tube embedded therein, said tube having an electrical resistance wire therein, said wire having its ends extending from the ends of said tube, said ends of said resistance wire being adapted to be connected to a source of electrical current.

3. In a filtration apparatus a replaceable porous filter heater comprising, as a unitary structure, a body of sintered particles of inert material with an electrical resistance heating wire insulated with glass sintered therein with its ends exposed for external electrical connections.

4. The method of producing a self-heated filter which comprises the steps of threading an electric resistance wire into a glass tube with its ends protruding, of embedding said threaded tube in a mass of inert sinterable material, of sintering said mass together with said tube into a porous body at a temperature and for a time preceding the liquidus state of said mass sufficient to cause sintering of adjacent particles and of cooling said sintered body.

References Cited in the file of this patent
UNITED STATES PATENTS

| Number | Name | Date |
|---|---|---|
| 761,204 | Carpenter | May 31, 1904 |
| 1,334,850 | George et al. | Mar. 23, 1920 |
| 1,476,116 | Thompson | Dec. 4, 1923 |
| 1,999,770 | Littleton | Apr. 30, 1935 |
| 2,103,434 | Pennebaker | Dec. 28, 1937 |
| 2,136,170 | Luertzing | Nov. 8, 1938 |
| 2,400,091 | Alfthan | May 14, 1946 |
| 2,401,797 | Rasmussen | June 11, 1946 |
| 2,484,003 | Simison | Oct. 4, 1949 |